US012585392B2

(12) United States Patent
Forsey et al.

(10) Patent No.: US 12,585,392 B2
(45) Date of Patent: Mar. 24, 2026

(54) NON-VOLATILE MEMORY DATA RETENTION USING SYSTEM RAM AND SSD

(71) Applicant: IGT, Las Vegas, NV (US)

(72) Inventors: Wayne Forsey, Riverview (CA);
Michael Patrick, Riverview (CA);
Patrick Russell, Riverview (CA)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/736,784

(22) Filed: Jun. 7, 2024

(65) Prior Publication Data

US 2025/0377807 A1 Dec. 11, 2025

(51) Int. Cl.
*G06F 12/00* (2006.01)
*G06F 3/06* (2006.01)
*G07F 17/32* (2006.01)

(52) U.S. Cl.
CPC .......... *G06F 3/0619* (2013.01); *G06F 3/0685* (2013.01); *G07F 17/3223* (2013.01); *G07F 17/3241* (2013.01); *G07F 17/3269* (2013.01)

(58) Field of Classification Search
None
See application file for complete search history.

(56) References Cited

U.S. PATENT DOCUMENTS

2019/0129865 A1* 5/2019 Fenster ...................... G06F 1/30
2020/0242885 A1* 7/2020 Culp .................... G07F 17/3241

* cited by examiner

*Primary Examiner* — Daniel D Tsui
(74) *Attorney, Agent, or Firm* — Sheridan Ross P.C.

(57) ABSTRACT

A gaming device includes a display device, a processor circuit, a battery charging circuit that is conductively coupled to a cabinet input power source and that provides a charging current to a battery, and a power state output signal that is transmitted to the processor circuit and that includes a value that depends on the first switching power input. The device further includes a controller that receives, from the processor circuit, an interrupt signal that indicates that first switching power has failed and transmits a switch signal to the power switching circuit that is caused to switch from providing power from the cabinet input power source to providing power from the battery, a first memory that includes operating memory instructions, and a second memory that is configured to receive the operating memory instructions from the first memory responsive to the interrupt signal indicating that first switching power has failed.

18 Claims, 8 Drawing Sheets

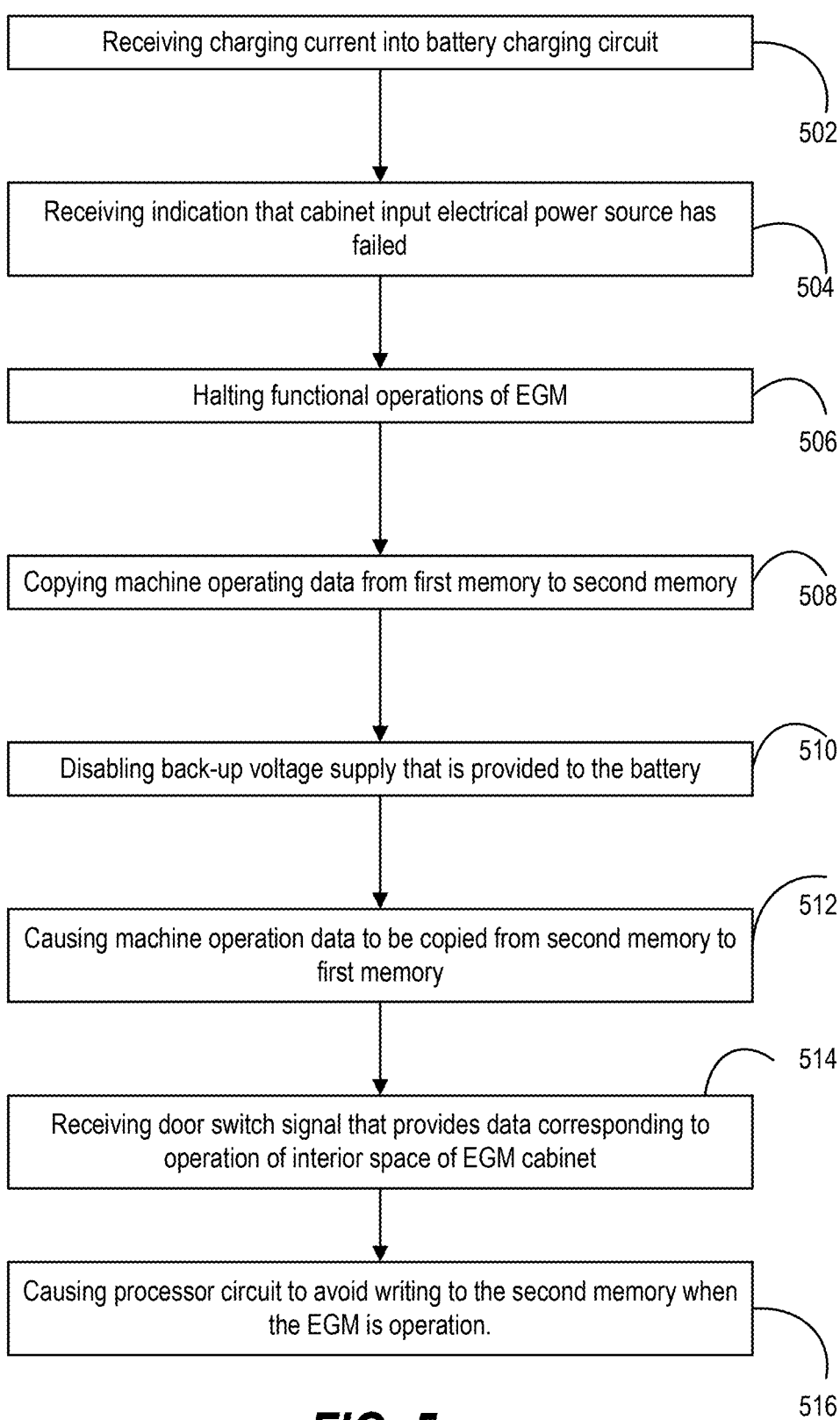

Receiving charging current into battery charging circuit

502

Receiving indication that cabinet input electrical power source has failed

504

Halting functional operations of EGM

506

Copying machine operating data from first memory to second memory

508

Disabling back-up voltage supply that is provided to the battery

510

Causing machine operation data to be copied from second memory to first memory

512

Receiving door switch signal that provides data corresponding to operation of interior space of EGM cabinet

514

Causing processor circuit to avoid writing to the second memory when the EGM is operation.

NON-VOLATILE MEMORY DATA RETENTION USING SYSTEM RAM AND SSD

BACKGROUND

Embodiments described herein relate to electronic gaming machines (EGMs), and in particular, to retaining data during a power interruption in EGMs and related systems, devices, and methods. Current systems may use SSDs (solid state drives) for storing game states, etc. In response to a power outage or interruption, these states need to be powered down safely.

Conventional approaches may include relying on the hardware in SSD to manage the function of moving the data from the SSDs cache to flash. Due to this, the SSD may be written very frequently. Based on the frequent writing to the SSD, the SSD may be subject to increased wear, which may reduce performance and longevity of the SSD. Disadvantages may be that games sometimes run slow, the SSDs prematurely fail and/or wear out and/or the games may not be stored without data corruption. Other cases include that game states may be lost. When the SSDs fail, the EGMs may be completely locked out. Thus, there is a need to provide reliable data retention for these EGMs during a power interruption.

SUMMARY

According to some embodiments, a gaming device includes a display device and a processor circuit. The device further includes a battery charging circuit that is conductively coupled to a cabinet input power source and that provides a charging current to a battery and a power switching circuit that includes a first switching power input that corresponds to the cabinet input power source, a second switching power input corresponding to the battery, and a power state output signal that is transmitted to the processor circuit and that includes a value that depends on the first switching power input. A controller receives, from the processor circuit, an interrupt signal that indicates that first switching power has failed and transmits a switch signal to the power switching circuit that is caused to switch from providing power from the cabinet input power source to providing power from the battery. A first memory includes operating memory instructions and a second memory is configured to receive the operating memory instructions from the first memory responsive to the interrupt signal indicating that first switching power has failed.

According to some embodiments, a system includes a processor circuit and a memory coupled to the processor circuit. A system may include a processor circuit and a battery charging circuit that is conductively coupled to a cabinet input power source and that provides a charging current to a battery. A power switching circuit includes a first switching power input that corresponds to the cabinet input power source, a second switching power input corresponding to the battery, and a power state output signal that is transmitted to the processor circuit and that includes a value that depends on the first switching power input. For example, the output state of the power switch is dependent on whether an interruption of the power from the power supply has occurred.

A controller receives, from the processor circuit, an interrupt signal that indicates that power supply has failed and transmits a switch signal to the power switching circuit that is caused to switch from providing power from the cabinet input power source to providing power from the battery. A RAM (first) memory includes operating memory instructions and a solid state drive (second memory) is configured to receive operating memory instructions from the RAM memory responsive to the interrupt signal indicating that the first switching power has failed. The solid state drive is caused to avoid writing to solid state drive memory when a host EGM is operating. A boost power converter may provide the second switching power input from the battery and based on the controller.

According to some embodiments, a method includes operations for memory data retention according to some embodiments. Methods herein include receiving, from a cabinet input electrical power source in an electronic game machine, a charging current into a battery charging circuit to provide the charging current to a battery. Operations further include receiving, into a processor circuit, an indication that the cabinet input electrical power source has failed. In response to receiving the indication that the cabinet input electrical power source has failed, operations include halting functional operations of an EGM.

In response to the functional operations being halted, further method operations may include copying machine operating data from a first memory including a first memory type to a second memory that includes a second memory type. In response to the copying being complete, operations may include disabling a back-up voltage supply that is provided by the battery.

BRIEF DESCRIPTION OF THE DRAWINGS

FIG. 5 is a schematic block diagram illustrating operations for memory data retention according to some embodiments.

DETAILED DESCRIPTION

Embodiments herein may use system random access memory (RAM) as a buffer while the power is on. In this manner, an SSD may not get written to when power is on. Some embodiments provide that when power fails, a signal may be sent to a motherboard to indicate that a power failure has occurred. In some embodiments, the motherboard may also be referred to as a controller herein. Responsive to the power failing, a small rechargeable battery will provide power to the motherboard and the SSD until the data from RAM is written into the SSD. Once the copy operation has been completed, the battery power may be terminated. In some embodiments, the battery size may be small, such as, for example, may be found in a battery pack with one or more coin cells or other configuration battery that may use cells other than coin cells. The battery will not need to be large because the copy will only take a very small amount of time. Once power is restored, the data may be moved from the SSD back to system RAM. In this manner, the gameplay may resume in the same state. Some embodiments provide that the SSD will last much longer in the field due to the small quantity of writes. In some embodiments, it may take much longer for the write endurance of the SSD to be exceeded.

Figure 1:
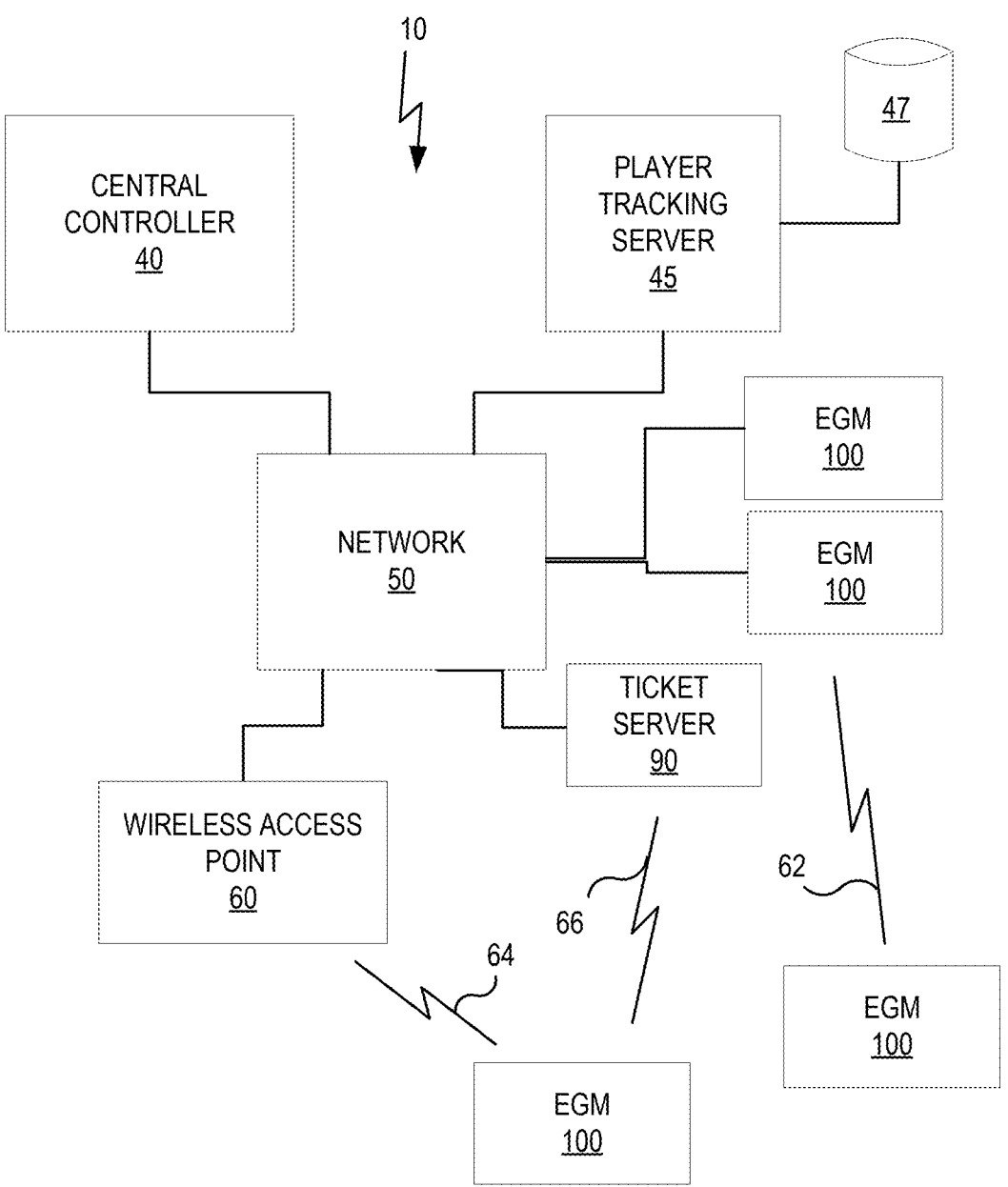
FIG. 1 is a schematic block diagram illustrating a network configuration for a plurality of gaming devices according to some embodiments.

Before discussing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
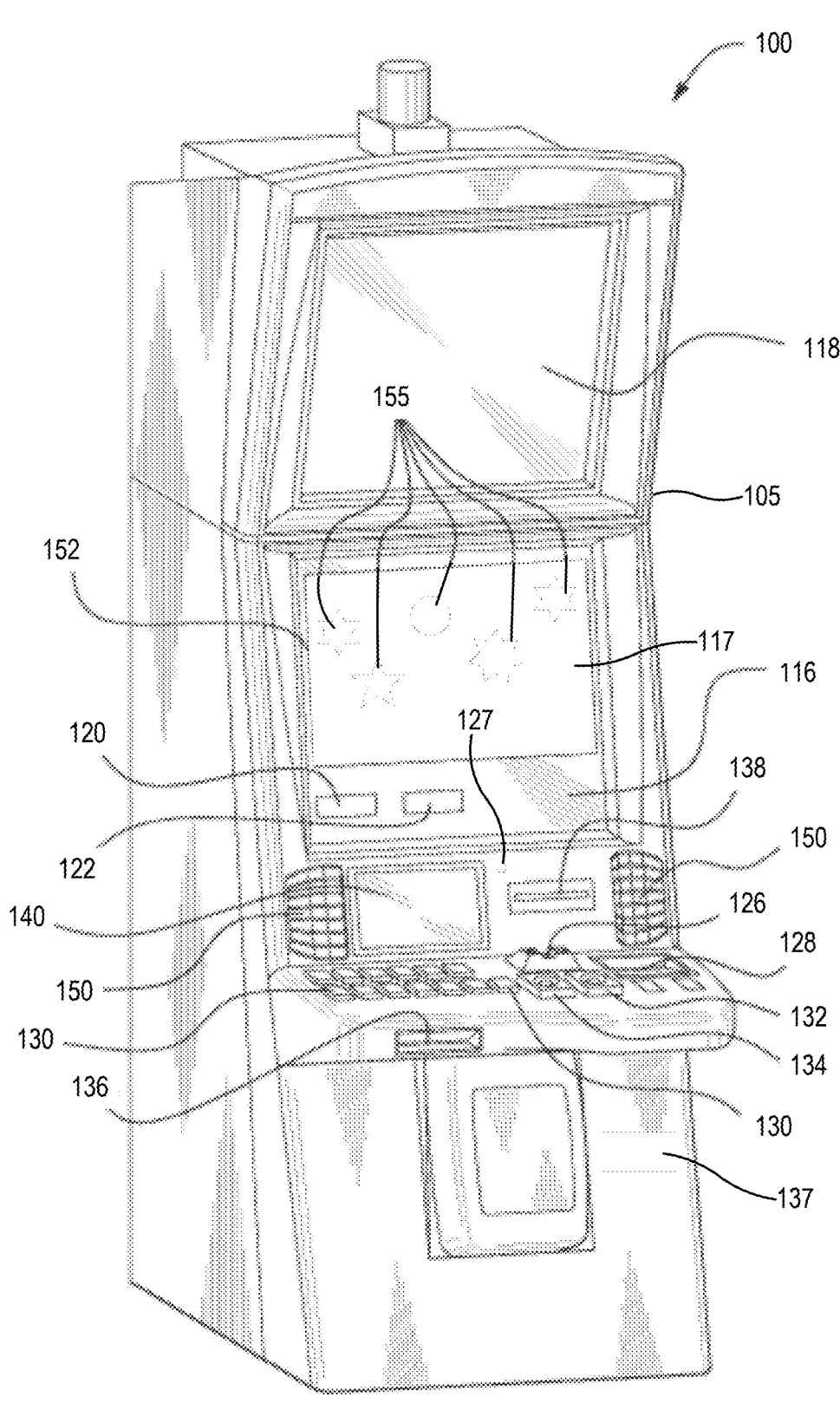
FIGS. 2A to 2E illustrate gaming devices according to various embodiments.
Figure 2B:
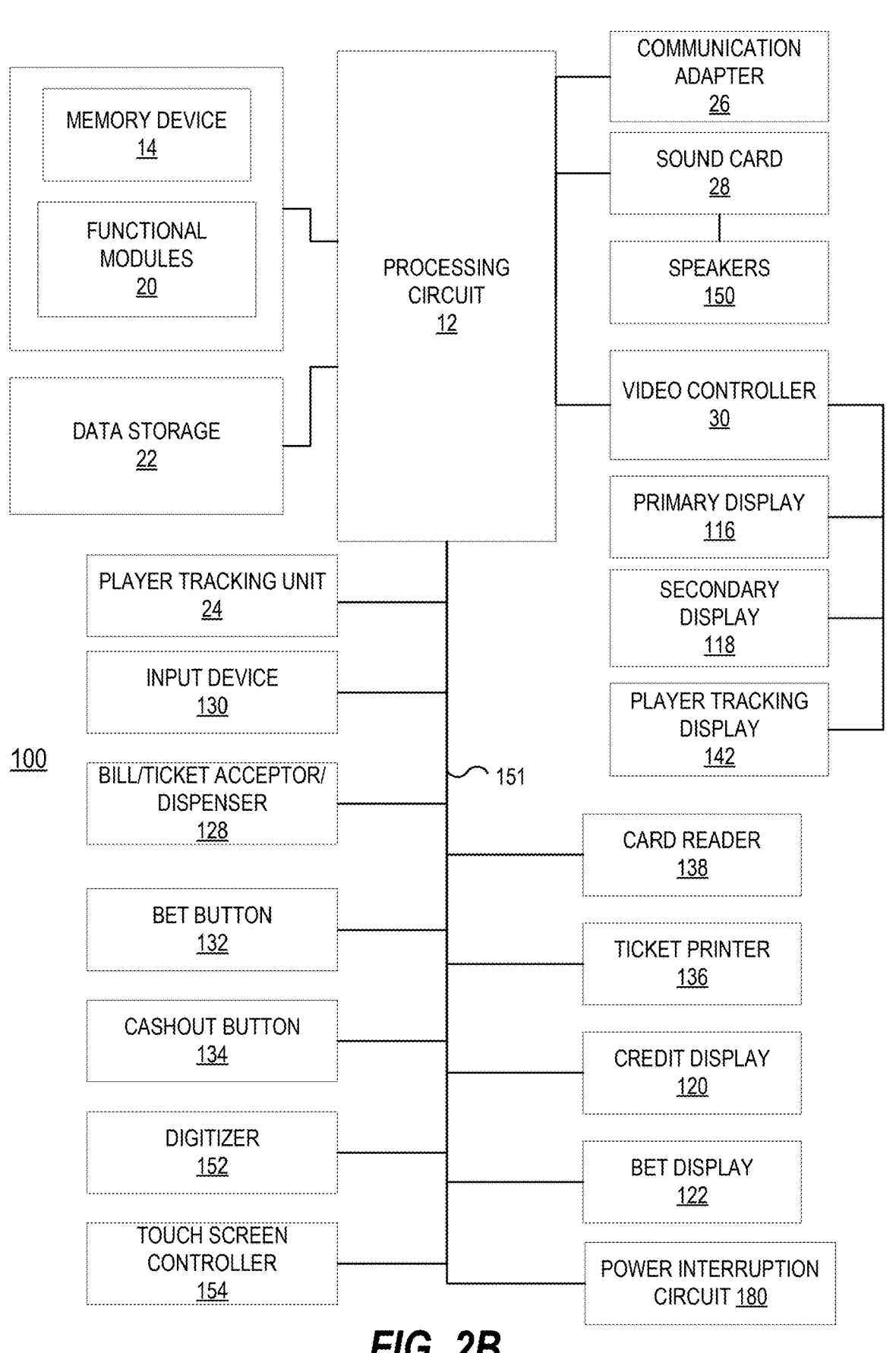
Figure 2C:
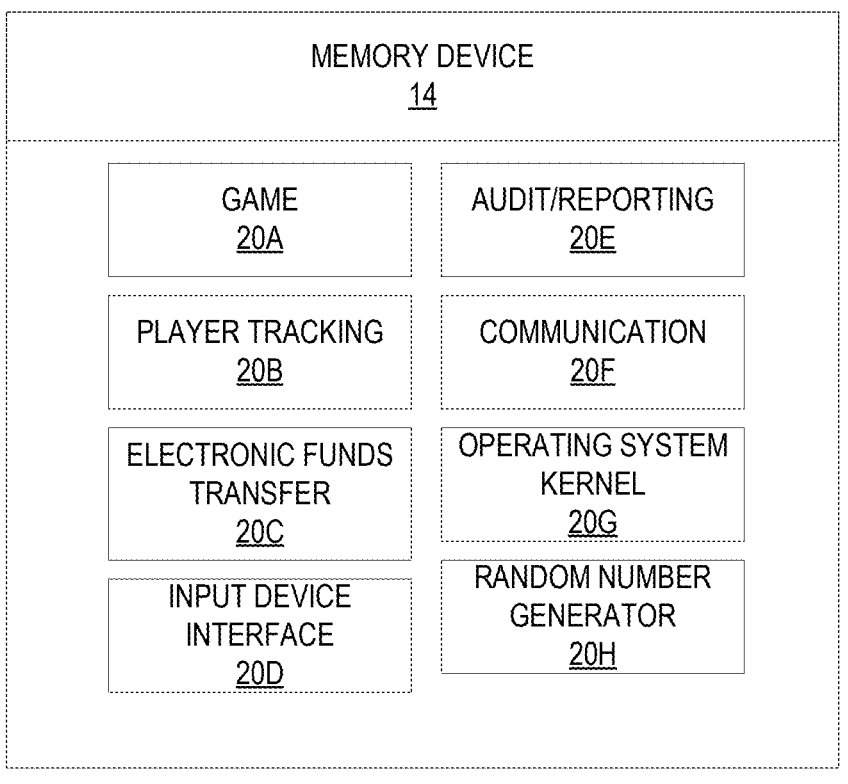

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices

116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Still referring to FIG. 2B, a power interruption circuit 180 may detect a power interruption and provide an orderly data retention operation in accordance with some embodiments herein.

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
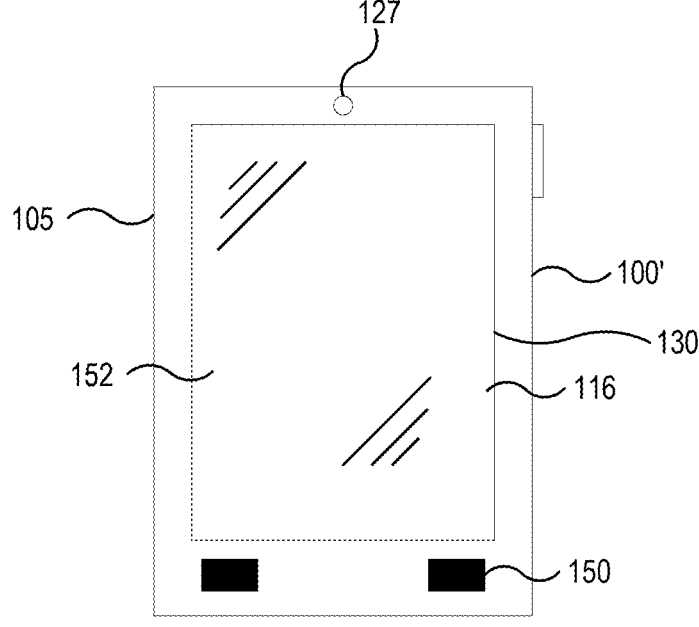

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
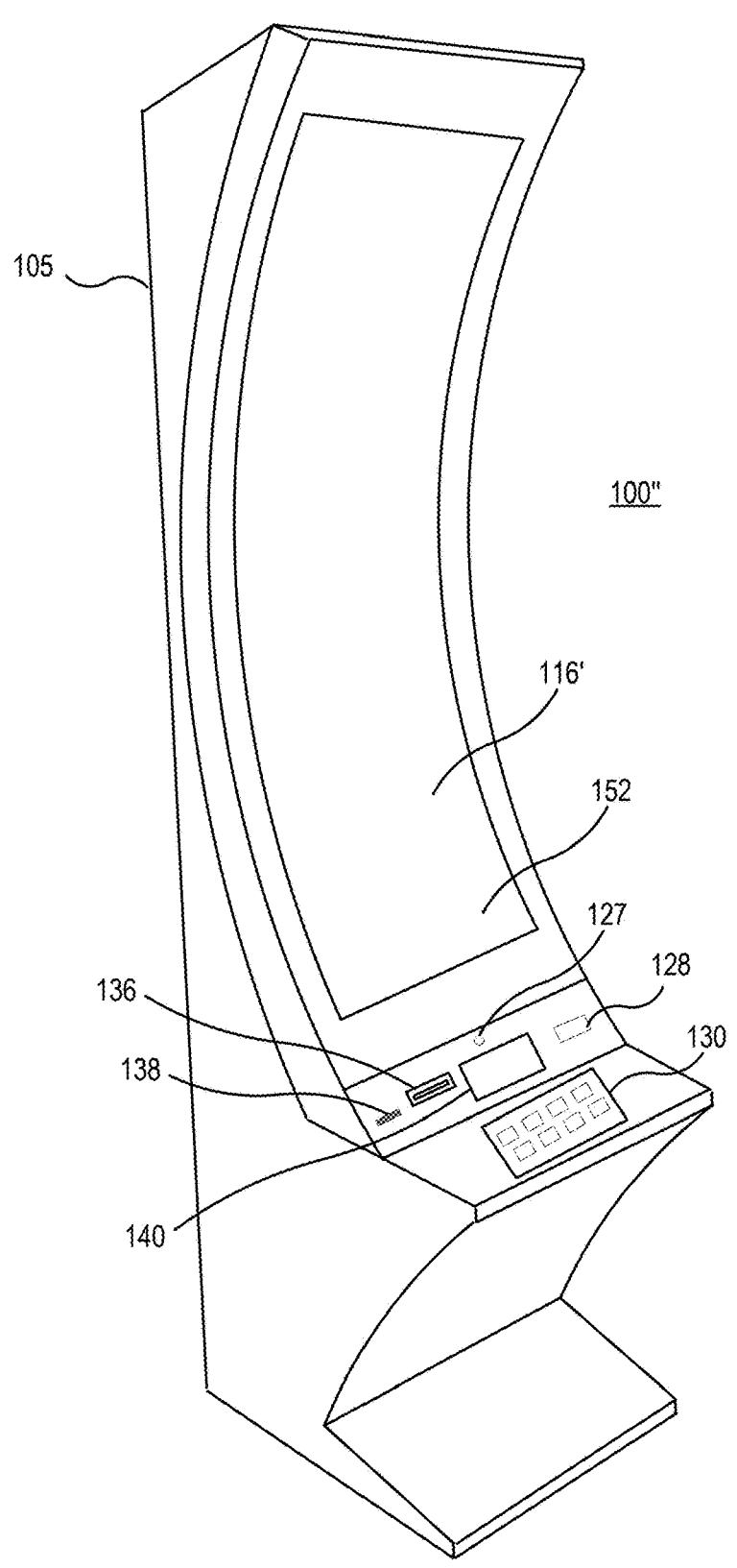

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
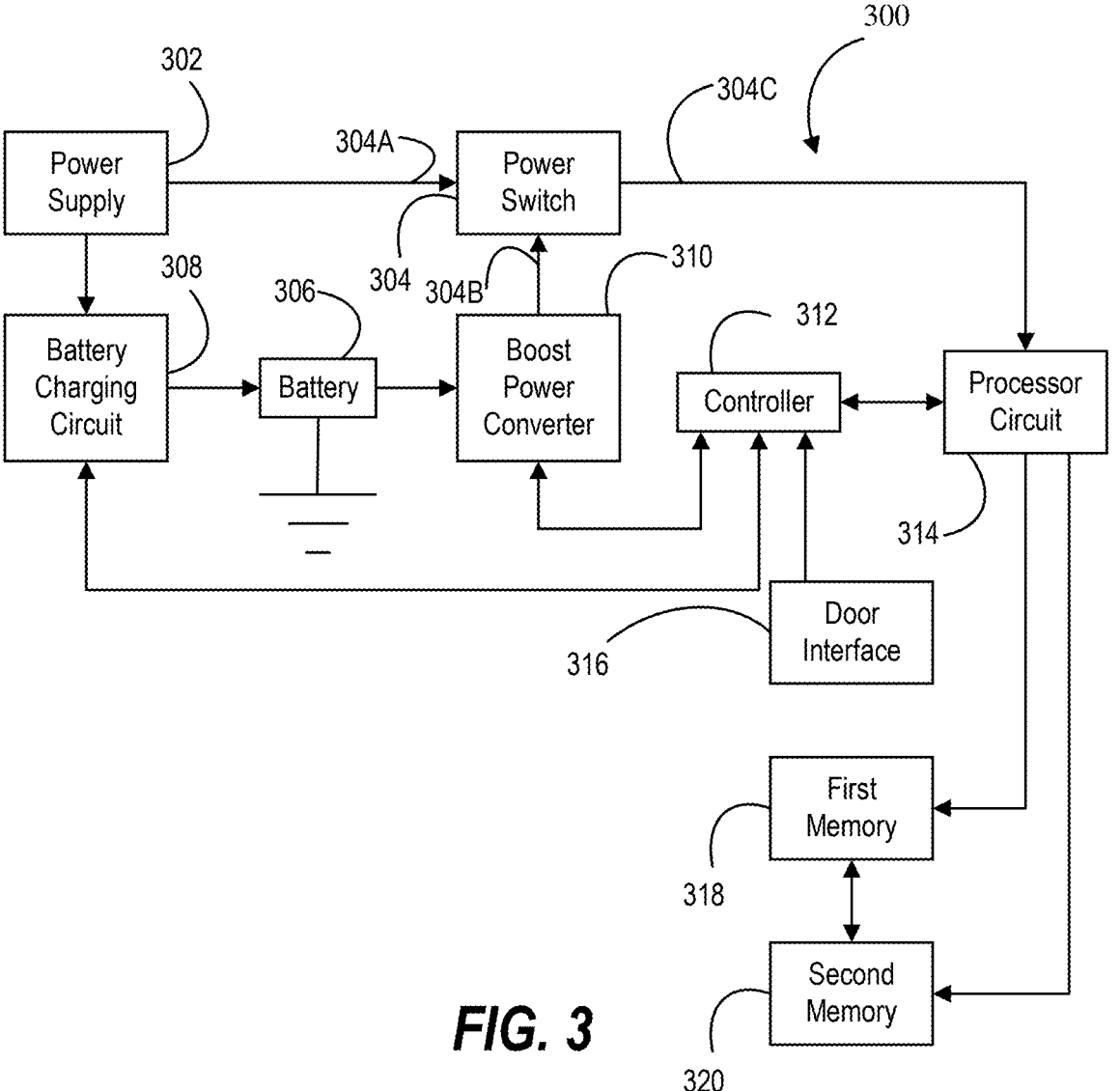
FIG. 3 is a schematic block diagram illustrating a system for non-volatile memory data retention using system RAM and SSD memory according to some embodiments

Reference is now made to FIG. 3, which is a schematic block diagram illustrating a system for non-volatile memory data retention using system RAM and SSD memory according to some embodiments. A system 300 according to some embodiments includes a power supply 302 that may provide electrical power for one or more portions of the electronic systems of a gaming device. While illustrated as being in the system 300, some embodiments provide that the power supply 302 is external thereto and that the power is provided from a remotely located component.

The system 300 may further include a battery charging circuit 308 that is operative to charge and/or maintain a charge of a battery 306. The system 300 may further include a power switch 304 that may include a first input that is power from the power supply 302 and a second input that is configured to receive power from the battery 306 via a boost power converter 310. The boost power converter 310 boosts and/or stabilizes the voltage from the battery so that if the power switch 304 switches from providing voltage to the processor circuit 314 to providing voltage from the battery 306, the voltage level during the transition may be seamless.

Responsive to the processor circuit 314 determining a voltage loss or interruption at the first input, the processor circuit 314 may send an interrupt signal to a controller circuit 312. In some embodiments, the interrupt signal may include USB interrupt packets and/or bulk packets to provide the signalling between the controller and the processor and may include standard IO protocols as well. The controller circuit 312 may communicate with the processor circuit 314 the battery charging circuit and/or the boost power converter 312 to perform operations as disclosed herein.

In some embodiments, the system 300 may include a first memory 318 and a second memory 320 that are operable to perform operations of transferring data from one to another. Some embodiments include a door interface 316 that may communicate with the controller circuit 312 to determine if data integrity of the data in the first memory 318 and/or second memory 320 has been compromised and/or corrupted.

Figure 4:
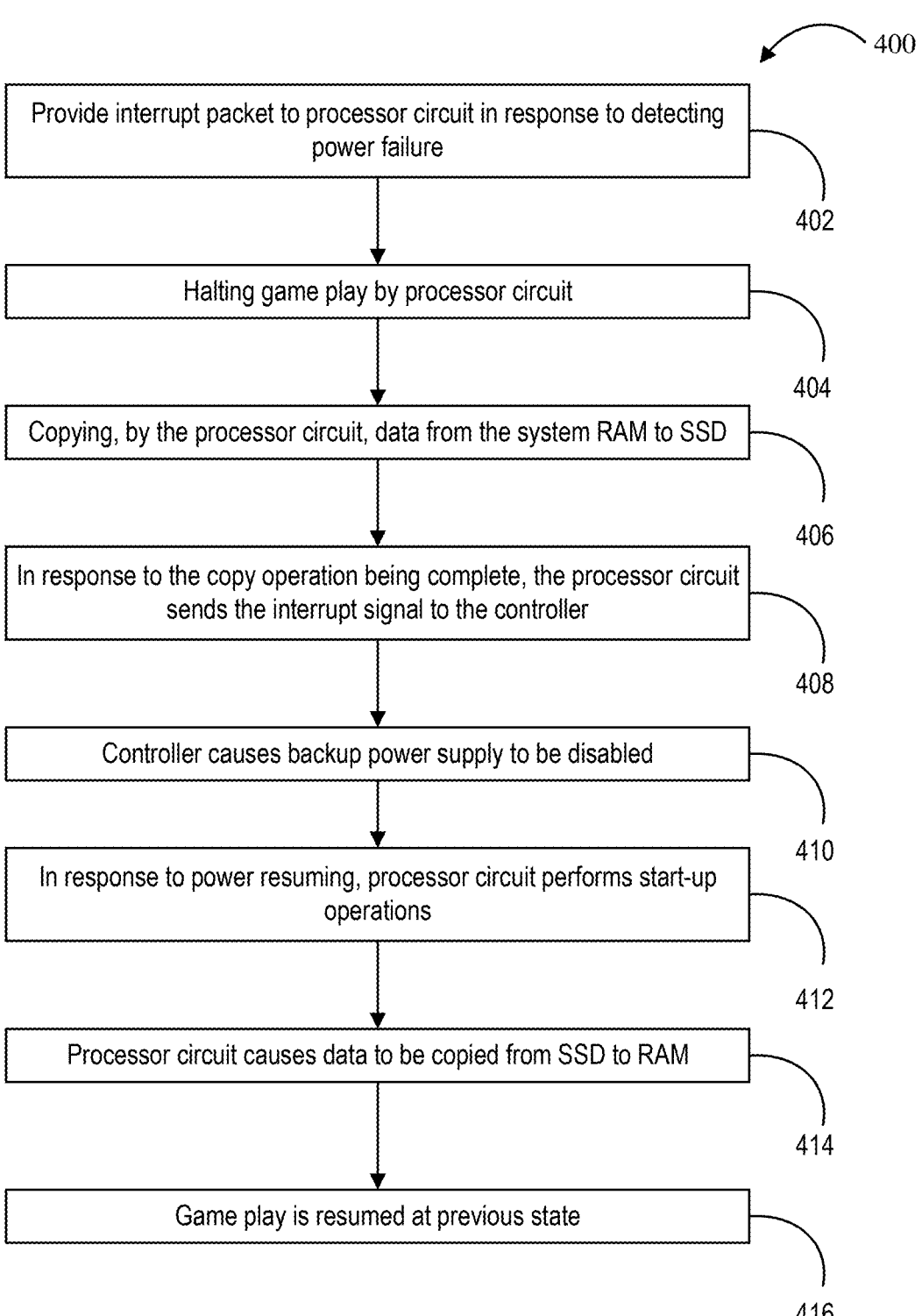
FIG. 4 is a schematic block diagram illustrating operations for non-volatile memory data retention using system RAM and SSD memory according to some embodiments.

Reference is now made to FIG. 4, which is a schematic block diagram illustrating operations for non-volatile memory data retention using system RAM and SSD memory according to some embodiments. Methods 400 according to some embodiments include providing an interrupt signal to a processor circuit in response to detecting power failure (block 402). The game may be halted (block 404) by the processor circuit. Methods include copying (block 406), by the processor circuit, data from the system RAM to SSD.

In some embodiments, in response to the copy operation being complete, the processor circuit sends (block 408) an interrupt to the controller circuit. Additionally, in response to the copy operations being completed, the controller circuit may cause (block 410) the backup power supply to be disabled.

In response to the power resuming, the processor circuit performs (block 412) start-up operations and causes (block 414) data to be copied from SSD to RAM. Once the copy operations are completed, the game play may be resumed (block 416) at its previous state.

Referring to FIGS. 3 and 4, some embodiments include a gaming device that includes a display device and a processor circuit 314. The system includes a battery charging circuit 308 that is conductively coupled to a cabinet input power source, which may be referred to as a power supply 302, and that provides a charging current to a battery 306. A power switching circuit 304, which may also be referred to herein as a power switch 304, may include a first switching power input that corresponds to the cabinet input power source 302, a second switching power input corresponding to the battery 306, and a power state output signal that is transmitted to the processor circuit 314. The power state output includes a value that depends on the state of the first switching power input.

The system may include a controller 312, which may be referred to herein as a controller circuit. The controller 312 may receive, from the processor circuit 314, an interrupt signal that indicates that first switching power that is provided by the power supply 302 has failed. In some embodiments, the processor circuit 314 transmits a switch signal to the power switching circuit 304 that is caused to switch from providing power from the cabinet input power source 302 to providing power from the battery 306. The system may further include a first memory 318 and a second memory 320 that may be used cooperatively to improve data retention based on data storage operations caused by the processor 314 and/or the controller 312.

In some embodiments, a first memory 318 includes operating memory instructions and a second memory 320 is configured to receive the operating memory instructions from the first memory in response to the interrupt signal indicating that first switching power input has failed.

Some embodiments provide that the first memory 318 includes a first memory type and the second memory 320 includes a second memory type that is different from the first memory type. In some embodiments, the first memory type includes a RAM memory and the second memory type includes a solid state drive (SSD).

In some embodiments, the first memory 318 and the second memory 320 are powered by the battery 306 for the second memory 320 to receive the operating memory instructions from the first memory 318 after the first switching power has failed. Some embodiments provide that, responsive to the controller 312 receiving a transfer compete indication corresponding to the operating memory instructions being moved to the second memory 320, the processor circuit 314 may cause the power switching circuit 304 to switch from the second switching power input to the first switching power input.

In some embodiments, in responsive to the controller 312 receiving a restored power indication that corresponds to the first switching power input being restored, the processor circuit 314 causes the operating memory instruction stored in the second memory 320 to be transferred to the first memory 318. Some embodiments provide that, once the operating memory instructions are transferred to the first memory 318, the processor circuit 314 boots a game from the operating memory instructions to resume game playing. Some embodiments provide that a boost power converter 310 may provide switching the second switching power input from the battery 306 and that is based on the controller 312.

In embodiments in which the power is restored before the write operation to the SSD is complete, the transfer to the SSD may be aborted and the SSD may resume gameplay by restoring using current RAM contents. Some other embodiments provide that the transfer may be completed and the RAM may be restored just as if the power was removed.

In some embodiments, the processor circuit 314 further receives a door switch signal 316 that provides data corresponding to an unauthorized operation of a cabinet door that may provide access to an interior space of the gaming device. In some embodiments, the display device generates an alert responsive to the unauthorized operation of the cabinet door.

Reference is now made to FIG. 5, which is a schematic block diagram illustrating operations for memory data retention according to some embodiments. Methods herein include receiving (block 502), from a cabinet input electrical power source in an electronic game machine, a charging current into a battery charging circuit to provide the charging current to a battery. Operations further include receiving (block 504), into a processor circuit, an indication that the cabinet input electrical power source has failed. In response to receiving the indication that the cabinet input electrical power source has failed, operations include halting (block 506) functional operations of an EGM.

In response to the functional operations being halted, further method operations may include copying (block 508) machine operating data from a first memory including a first memory type to a second memory that includes a second memory type. In response to the copying being complete, operations may include disabling (block 510) a back-up voltage supply that is provided by the battery. In some embodiments, the first memory type comprises a system random access memory and the second memory type comprises a solid state drive memory.

Some embodiments further include, in response to detecting that the cabinet input electrical power source is restored, causing (block 512) the machine operational data to be copied from the second memory to the first memory. In some embodiments, the machine operational data includes operating data that is executable and machine state data that corresponds to an operating state of the electronic game machine when the cabinet input electrical power source failed.

Some embodiments include causing the electronic game machine to resume operating corresponding to the machine state data once the machine operational is finished being copied back to the first data. In some embodiments, the first memory includes random access memory and the second memory includes non-volatile memory.

Operations according to some methods may include receiving (block 514) a door switch signal that provides data corresponding to operation of a cabinet door that provides access to an interior space of the electronic game machine. Operations further include causing the processor circuit to generate and transmit an alert corresponding to door switch signal.

Some embodiments include causing (bock 516) the processor circuit to avoid writing to the second memory when the electronic game machine is operating.

In some embodiments, the second memory 320 is operated to perform less than ten times as many write times as the second memory conducts reading operations. Thus, by reducing the write operations the wear on the second memory 320 may be advantageously reduced.

Referring back to FIG. 3, embodiments herein may be directed to systems for memory data retention according to some embodiments. A system may include a processor circuit 314 and a battery charging circuit 308 that is conductively coupled to a cabinet input power source 302 and that provides a charging current to a battery 306. A power switching circuit 304 includes a first switching power input 304A that corresponds to the cabinet input power source 302, a second switching power input 304B corresponding to the battery 306, and a power state output signal 304C that is transmitted to the processor circuit 314 and that includes a value that depends on the first switching power input 304A. For example, the output state of the power switch is dependent on whether an interruption of the power from the power supply 302 has occurred.

A controller 312 receives, from the processor circuit 314, an interrupt signal that indicates that power supply 302 has failed and transmits a switch signal to the power switching circuit 304 that is caused to switch from providing power from the cabinet input power source 302 to providing power from the battery 306. A RAM (first) memory 318 includes operating memory instructions and a solid state drive (second memory) 320 is configured to receive operating memory instructions from the RAM memory 318 responsive to the interrupt signal indicating that the first switching power 304A has failed. The solid state drive 320 is caused to avoid writing to solid state drive memory 320 when a host EGM is operating. A boost power converter 310 may provide the second switching power input 304B from the battery 306 and based on the controller 312.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

16

What is claimed is:

1. A gaming device comprising:
a display device;
a processor circuit;
a battery charging circuit that is conductively coupled to a cabinet input power source and that provides a charging current to a battery;
a power switching circuit that comprises a first switching power input that corresponds to the cabinet input power source, a second switching power input corresponding to the battery, and a power state output signal that is transmitted to the processor circuit and that comprises a value that depends on the first switching power input;
a controller that receives, from the processor circuit, an interrupt signal that indicates that first switching power has failed and transmits a switch signal to the power switching circuit that is caused to switch from providing power from the cabinet input power source to providing power from the battery;
a first memory that comprises operating memory instructions; and
a second memory that is configured to receive the operating memory instructions from the first memory responsive to the interrupt signal indicating that first switching power has failed,
wherein the first memory and the second memory are powered by the battery for the second memory to receive the operating memory instructions from the first memory after the first switching power has failed, and
wherein, responsive to the controller receiving a transfer compete indication corresponding to the operating memory instructions being moved to the second memory, the processor circuit causes the power switching circuit to switch from the second switching power input to the first switching power input.

2. The gaming device of claim 1, wherein the first memory comprises a first memory type and the second memory comprises a second memory type that is different from the first memory type.

3. The gaming device of claim 1, wherein the first memory type comprises a RAM memory and the second memory type comprises a solid state drive (SSD).

4. The gaming device of claim 1, wherein, responsive to the controller receiving a restored power indication that corresponds to the first switching power input being restored, the processor circuit causes the operating memory instruction stored in the second memory to be transferred to the first memory.

5. The gaming device of claim 4, wherein once the operating memory instructions are transferred to the first memory and the processor circuit boots a game from the operating memory instructions to resume game playing.

6. The gaming device of claim 1, further comprising a boost power converter that provides the second switching power input from the battery and that is based on the controller.

7. The gaming device of claim 1 wherein the processor circuit further receives a door switch signal that provides data corresponding to an unauthorized operation of a cabinet door that provides access to an interior space of the gaming device.

8. The gaming device of claim 7, wherein the display device generates an alert responsive to the unauthorized operation of the cabinet door.

9. The gaming device of claim 1, wherein the second memory is operated to perform less than ten times as many write times as the second memory conducts reading operations.

10. A method comprising:

receiving, from a cabinet input electrical power source in an electronic game machine, a charging current into a battery charging circuit to provide a charging current to a battery;

receiving, into a processor circuit, an indication that the cabinet input electrical power source has failed;

in response to receiving the indication that the cabinet input electrical power source has failed, halting functional operations of an electronic game machine;

in response to the functional operations being halted, operations comprise copying machine operating data from a first memory comprising a first memory type to a second memory comprising a second memory type; and in response to the copying being complete, disabling a back-up voltage supply that is provided by the battery, wherein the first memory and the second memory are powered by the battery for the second memory to receive the operating memory instructions from the first memory after the first switching power has failed, and wherein, responsive to the controller receiving a transfer compete indication corresponding to the operating memory instructions being moved to the second memory, causing the power switching circuit to switch from the second switching power input to the first switching power input.

11. The method of claim 10, wherein the first memory type comprises a system random access memory and the second memory type comprises a solid state drive memory.

12. The method of claim 10, further comprising, in response to detecting that the cabinet input electrical power source is restored, causing the machine operational data to be copied from the second memory to the first memory.

13. The method of claim 12, wherein the machine operational data comprises operating data that is executable and machine state data that corresponds to an operating state of the electronic game machine when the cabinet input electrical power source failed.

14. The method of claim 13, causing the electronic game machine to resume operating corresponding to the machine state data once the machine operational is finished being copied back to the first data.

15. The method of claim 12, wherein the first memory comprises random access memory and the second memory comprises non-volatile memory.

16. The method of claim 10, further comprising:

receiving a door switch signal that provides data corresponding to operation of a cabinet door that provides access to an interior space of the electronic game machine; and causing the processor circuit to generate and transmit an alert corresponding to door switch signal.

17. The method of claim 10, further comprising causing the processor circuit to avoid writing to the second memory when the electronic game machine is operating.

18. A system comprising:

a processor circuit;

a battery charging circuit that is conductively coupled to a cabinet input power source and that provides a charging current to a battery;

a power switching circuit that comprises a first switching power input that corresponds to the cabinet input power source, a second switching power input corresponding to the battery, and a power state output signal that is transmitted to the processor circuit and that comprises a value that depends on the first switching power input;

a controller that receives, from the processor circuit, an interrupt signal that indicates that first switching power has failed and transmits a switch signal to the power switching circuit that is caused to switch from providing power from the cabinet input power source to providing power from the battery;

a RAM memory that comprises operating memory instructions;

a solid state drive that is configured to receive operating memory instructions from the RAM memory responsive to the interrupt signal indicating that the first switching power has failed, the solid state drive being caused to avoid writing to solid state drive memory when a host electronic game machine is operating; and a boost power converter that provides the second switching power input from the battery and based on the controller, wherein a first memory and a second memory are powered by the battery for the second memory to receive the operating memory instructions from the first memory after the first switching power has failed, and wherein, responsive to the controller receiving a transfer compete indication corresponding to the operating memory instructions being moved to the second memory, causing the power switching circuit to switch from the second switching power input to the first switching power input.

* * * * *